United States Patent [19]

Nishikawa et al.

[11] Patent Number: 4,727,385

[45] Date of Patent: Feb. 23, 1988

[54] IMAGE FORMING APPARATUS INCLUDING MEANS FOR DEHUMIDIFYING

[75] Inventors: Masaji Nishikawa; Masashi Asano, both of Tokyo, Japan

[73] Assignee: Olympus Optical Co., Ltd., Tokyo, Japan

[21] Appl. No.: 876,831

[22] Filed: Jun. 20, 1986

[30] Foreign Application Priority Data

| | | | |
|---|---|---|---|
| Jul. 8, 1985 | [JP] | Japan | 60-148426 |
| Sep. 5, 1985 | [JP] | Japan | 60-194947 |
| May 2, 1986 | [JP] | Japan | 61-102678 |

[51] Int. Cl.[4] ........ G01D 15/00

[52] U.S. Cl. ........ 346/153.1; 355/30

[58] Field of Search ........ 346/153.1, 145; 355/30; 236/DIG. 13; 34/46.50; 219/216; 101/DIG. 13; 400/114; 358/300; 250/423 R, 423 P, 423 F; 165/14, 16, 21, 30, 3

[56] References Cited

U.S. PATENT DOCUMENTS

| | | | |
|---|---|---|---|
| 3,689,935 | 9/1972 | Pressman et al. | 355/30 |
| 4,160,257 | 7/1979 | Carrish | 355/30 |
| 4,259,565 | 3/1981 | Ogino et al. | 346/153.1 |
| 4,365,549 | 12/1982 | Fotland et al. | 355/30 |
| 4,485,982 | 12/1984 | St. John et al. | 355/30 |
| 4,645,327 | 2/1987 | Kimura et al. | 355/30 |

FOREIGN PATENT DOCUMENTS

| | | | |
|---|---|---|---|
| 50-80713 | 7/1975 | Japan | 355/30 |
| 53-12326 | 3/1978 | Japan | 355/30 |
| 55-16565 | 5/1980 | Japan | 355/30 |
| 56-35147 | 7/1981 | Japan | 355/30 |
| 57-56855 | 5/1982 | Japan | 355/30 |
| 57-78577 | 5/1982 | Japan | 355/30 |
| 57-114158 | 7/1982 | Japan | 355/30 |
| 57-122455 | 7/1982 | Japan | 355/30 |
| 57-124753 | 8/1982 | Japan | 355/30 |
| 60-219071 | 11/1985 | Japan | 355/30 |

*Primary Examiner*—Arthur G. Evans
*Attorney, Agent, or Firm*—Frishauf, Holtz, Goodman & Woodward

[57] ABSTRACT

An image forming apparatus comprises an image forming paper supply section for supplying image forming paper having a paper base, an image forming section for forming a given image on the image forming paper supplied from the image forming paper supply section, an enclosure for enclosing at least the image forming paper supply section, and a cooling/dehumidifying unit for cooling the inside of the enclosure and condensing and aqueous components contained in the air inside the enclosure, thereby to dehumidify the inside of the enclosure.

10 Claims, 14 Drawing Figures

IMAGE FORMING APPARATUS INCLUDING MEANS FOR DEHUMIDIFYING

BACKGROUND OF THE INVENTION

This invention relates to an image forming apparatus including means for dehumidifying and, more particularly, to an arrangement capable of high-quality image formation without being influenced by environmental humidity in an image forming apparatus, which has a recording sheet supply section and an image forming section, and which forms an image on a recording sheet of paper.

Various types of image recording apparatuses which form an image on various paper recording sheets are well known, and are used in practical applications. However, since paper is formed of a hygroscopic material (e.g., pulp), it can be easily influenced by environmental humidity to absorb moisture or to dry out. As a result, the material or characteristics of the recording sheet are changed, causing dimensional error or mechanical deformation. This poses various problems in image recording.

For example, in an electrophotographic apparatus using a photosensitive sheet, the charging capacity of a recording sheet is degraded to decrease an image density or the mechanical strength of the sheet, thus making convey of the recording sheet impossible. In a plain paper copy machine, if a recording sheet absorbs moisture, a toner image cannot be satisfactorily transferred thereto, and it is difficult to reliably convey the recording sheet. In a conventional electrostatic plotter and the like, an electrostatic latent image is formed using a multistylus recording head or an ion-flow electrostatic recording head on an electrostatic recording sheet consisting of a conductive-processed paper sheet coated with a dielectric layer, and the latent image is developed by toner to form a visible image. In apparatuses of this type, when the recording sheet absorbs moisture, image density is decreased or the recording sheet is easily wrinkled. This results in poor contact between the recording sheet and the head, and makes development impossible.

As image forming apparatuses which sequentially form images of different colors on a single sheet to form a multicolor image, an electrostatic color plotter, a thermal transfer color printer, a thermal transfer color plotter, an electrophotographic color copy machine, an electrophotographic color printer, and the like are well known. In these apparatuses, if the water content of a recording sheet changes while images of different colors are being formed on a single sheet at different timings, the size of the recording sheet is changed, thus causing a shift in the colors.

In addition to such changes in recording sheets, other constituents of image recording apparatuses are also influenced by the change in environmental humidity. For example, the dry developing agent of an electrophotographic recording apparatus induces a decrease in electrical resistance or charging capacity when there is high humidity, thus causing fogging of the image. In a multistylus electrostatic recording head, electrodes may be impaired over time by rust.

As a countermeasure against the above problems, drying means using heat has been conventionally proposed. For example, Japanese Patent Disclosure No. 53-12326 discloses heating means which increases the ambient temperature in a copying machine. U.S. Pat. No. 4,259,565 also describes a similar apparatus. Japanese Patent Publication No. 56-35147 discloses a method of absorbing moisture in a copying machine using a moisture absorbent (drying agent). In addition, Japanese Patent Disclosure No. 57-78577 discloses an apparatus including a metal plate or fin for allowing condensation to take place at an airflow intake port.

However, a drying operation using heating increases the temperature in the copying machine, and can thereby cause other problems. If the relative humidity is excessively decreased by drying, there are other problems associated therewith. Moisture absorption using a drying agent requires maintenance (e.g., periodical replacement of the drying agent), and moisture absorption capacity is very small. Therefore, a satisfactory drying effect cannot be expected. In addition, even if a fin or a metal plate is arranged at an airflow intake port, condensation occurs on this portion under quite limited conditions. If air is continuously introduced into the copying machine, almost no moisture absorption effect can be expected.

FIGS. 1 to 4 explain drawbacks in a conventional recording apparatus using an electrostatic recording sheet in high humidity, and problems caused by heat-drying.

FIG. 1 is a schematic diagram of a conventional recording apparatus using an electrostatic recording sheet. Referring to FIG. 1, reference numeral 1 denotes an electrostatic recording sheet wound in the form of a roll. Recording sheet 1 is extended by feed rollers 2 and exhaust rollers 3 to be conveyed for recording. Auxiliary electrodes 4 and recording head 5 for forming an electrostatic latent image on recording sheet 1, developing head 6 for developing the latent image by toner, and fixing head 7 for fixing a developed toner image are arranged between rollers 2 and 3. The latent image is formed on sheet 1 by electrodes 4 and head 5 to which, e.g., +300 V and −300 V voltages are selectively applied by control device 8. The latent image is developed by head 6 to form a toner image, the toner image is fixed by head 7, and sheet 1 is exhausted by rollers 3.

The main drawback in the electrostatic recording apparatus with the above arrangement is that recording quality on recording sheet 1 varies widely according to the environmental humidity. This is due to a change in electrical resistance of the recording sheet caused by humidity. For example, as can be seen from the graph of FIG. 2 showing a change in surface resistance in relation to relative humidity, when the relative humidity changes from 30% to 75% at 25° C., the surface resistance of the recording sheet changes from $1.5\times10^{3}$ Ω·cm to $5\times10^{8}$ Ω·cm.

Recording image quality is also degraded in a low humidity state (about 40%RH or lower). For example, since the electrical resistance of a recording sheet is normally high in this state, a sufficient charging current cannot flow and, hence, a charging potential is not increased satisfactorily, thus decreasing the recording density.

In order to eliminate this drawback, a voltage to be applied to a recording electrode is increased in the low humidity state. However, with this method, additional components (e.g., a humidity sensor) are required, resulting in an expensive, complicated apparatus. In addition, a so-called "abnormal discharging" phenomenon easily occurs. In the "abnormal discharging" phenomenon, air is ionized by the voltage applied to the recording head, and the ions cause avalanche breakdown in the recording head, thus charging non-recording portions of the recording sheet. Therefore, the "abnormal discharging" phenomenon considerably degrades recording quality.

In a high humidity state exceeding about 65%RH, a known "ghost recording" phenomenon occurs. However, even if "ghost recording" does not occur, since charges on the sheet are discharged in the high humidity state, the recording density is decreased.

FIG. 3 is a graph wherein changes in image density of images obtained by recording sheets prepared to correspond with various environmental conditions are plotted in correspondence with a change in relative humidity. Curve a indicates characteristics of a high-humidity electrostatic recording sheet; curve b, those of a low-humidity electrostatic recording sheet; and curve c, those of a multi-environmetal electrostatic recording sheet. The recording sheets indicated by curves a and b provide high recording densities under their optimal humidity conditions, but have poor stability against a change in relative humidity. Therefore, when the environmental condition changes drastically, good image density cannot be obtained by an identical recording sheet.

"Ghost recording" is a phenomenon wherein a potential around a recording head is undesirably increased, and a "shadow" image is formed on a non-recording portion as if recording had been performed. This phenomenon also considerably degrades the recording quality.

It should be noted that, e.g., in Japan, a low-humidity state (30%RH or lower) often occurs during heating in the winter, and a high-humidity state exceeding 75%RH frequently occurs during the rainy season and in the summer. Therefore, such high- and low-humidity states quite frequently occur, and hence, image quality is also frequently degraded.

The above problems can be solved by an electrostatic recording sheet whose electrical resistance does not change or cannot be easily changed even if the relative humidity changes. However, such a recording sheet has not yet been realized. For this reason, several types of recording sheets are provided and are selectively used in accordance with the environmental conditions, resulting in cumbersome operation. In addition, even though such selective use is made, it is very difficult to obtain a good image under high-humidity conditions exceeding 75%RH.

In another conventional countermeasure, an electrostatic recording sheet capable of satisfactory recording in the low-humidity state is used, and is heated and dried to be kept in the low-humidity state. For example, as shown in FIG. 4, heater 10 comprising heat radiation plate 9 is arranged adjacent to electrostatic recording sheet 1, wound in the form of a roll, to heat it. With this arrangement, when air at 25° C. and 75%RH is heated to 40° C., the relative humidity is decreased to about 30%. However, with this arrangement, heater 10 must always be on. For this reason, if heater 10 malfunctions, since there is the possibility of fire, quite expensive anti-malfunction equipment is required. In addition, heater 10 consumes much power (about 100 wattage or higher) and takes a great deal of time to increase the temperature to a predetermined value. This means that when heater 10 is ON/OFF controlled depending on the environmental humidity, since the humidity increases rapidly in the rainy season, an increase in temperature that heater 10 cannot cope therewith. As a result, the recording sheet undesirably absorbs moisture.

The drying operation by heating decreases the relative humidity even in the low-humidity state, and induces variations in recording characteristics due to excess drying, as described previously. In addition, when the heating/drying operation is continued until a sufficient effect can be obtained, it tends to increase the overall temperature of the apparatus. This often adversely influences electronic circuits and other components of the apparatus as well as such things as the developing agent liquid. As shown in FIG. 4, when recording sheet 1 in the form of a roll is used, the paper is wound to maintain a given tension. If the humidity changes, recording sheet 1 is extended or contracted to cause distortion, and this distortion appears as wrinkles which interfere with uniform charging and development.

In an electrostatic image forming apparatus, high humidity adversely influences not only the recording sheet but also a recording head. For example, in a multistylus electrostatic recording head, wires constituting the multistylus rust in the high-humidity state, thus degrading recording characteristics. In an ion-flow recording head (to be described later), recording characteristics are also degraded by poor insulation due to moisture absorption and low resistance of foreign materials which become attached near the head.

Problems caused by moisture absorption and drying of a recording sheet is significant in a color image forming apparatus. For example, images of different colors are formed during respective reciprocating cycles while the recording sheet is reciprocated with respect to the recording head, so that the images are time-serially overlaid on each other. This arrangement is well known as per Japanese Patent Disclosure Nos. 50-80713, 57-114158, and the like. However, in the recording apparatus of this type, if the recording sheet absorbs moisture or is dried during recording, the size thereof changes, causing shifting of the colors. In order to prevent this, as disclosed in Japanese Patent Disclosure Nos. 57-124753 and 57-122455, marks are recorded on a non-recording portion of the recording sheet at equal intervals, and a change in size is calculated by reading a distance between the marks to control recording dot positions accordingly. However, such processing is complicated, and even if it is executed, a change in the widthwise size of the recording sheet cannot be corrected.

As described above, problems in the image recording apparatuses frequently occur when the recording sheet or the apparatus is in the high-humidity state, and conventional countermeasures for these problems provide insufficient effects or induce additional problems.

SUMMARY OF THE INVENTION

It is, therefore, an object of the present invention to provide a new and improved image forming apparatus including means for dehumidifying, which can effectively prevent moisture absorption by a recording sheet, allows easy maintenance, and can maintain a strong dehumidifying effect whose level can be desirably set without causing an excessive drying effect or other problems caused by an increase in temperature.

According to the present invention, there is provided an image forming apparatus comprising:

an image forming paper supply section for supplying image forming paper having a paper base;

an image forming section for forming a given image on the image forming paper supplied from the image forming paper supply section;

an enclosure for enclosing at least the image forming paper supply section; and cooling/dehumidifying means for cooling the inside of the enclosure and condensing aqueous components contained in air inside the enclosure, to thereby dehumidify the inside of the enclosure.

With the above arrangement, humidity can be decreased without increasing the air temperature, and constituents for image formation of the apparatus will not be adversely influenced. The dehumidifying effect is automatically stopped under dry conditions, thus preventing excessive drying. In addition, the dehumidifying effect can be maintained for a long period of time without any specific maintenance, and various problems caused by moisture absorption by a recording sheet and degradation in the recording apparatus due to high humidity can be prevented.

BRIEF DESCRIPTION OF THE DRAWINGS

These and other objects and features of the present invention can be understood through the following embodiments by reference to the accompanying drawings, in which.

DETAILED DESCRIPTION OF THE PREFERRED EMBODIMENTS

An image forming apparatus of the present invention, which has a recording sheet supply section and an image forming section and forms an image on a recording sheet having a paper base, as previously described, includes an enclosure for enclosing at least the recording sheet supply section, and a cooling/dehumidifying means for condensing and dehumidifying an aqueous component of air inside the enclosure, thereby condensing the aqueous component of the air inside the enclosure into water droplets and dehumidifying the air inside the enclosure. Therefore, an image forming apparatus according to an embodiment of the present invention is preferably arranged as follows.

A recording sheet is most easily influenced by humidity. Therefore, the recording sheet supply section is enclosed by the enclosure except for a recording sheet supply opening, and an aqueous component of air inside the enclosure is condensed into water droplets by the cooling/dehumidifying means, thereby dehumidifying the air inside the enclosure.

The cooling/dehumidifying means can comprise a dehumidifying device which cools air such that compressed air is cooled and then adiabatically expanded. However, a compact, easily maintained electronic cooling device utilizing the Peltier effect is more preferably used. More specifically, when the cooling surface of the electronic cooling device is arranged inside the enclosure, a very compact image forming apparatus having a high dehumidifying effect can be realized.

Figure 5:
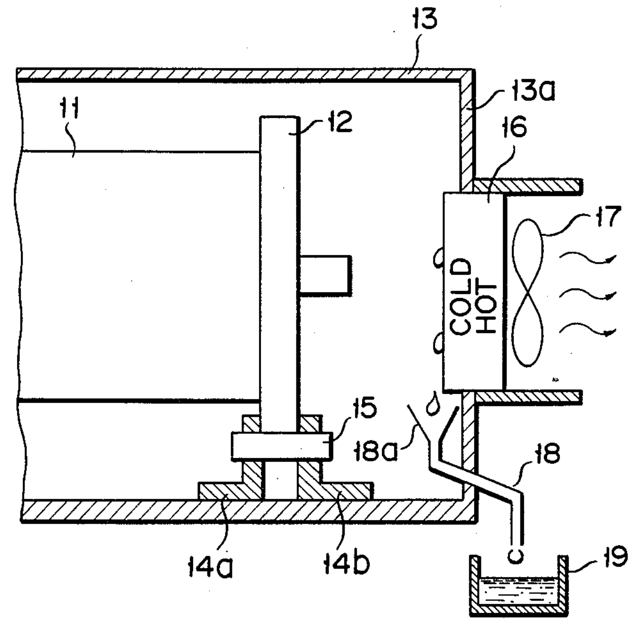
FIG. 5 is a partially cutaway side view of an arrangement according to a first embodiment of the present invention.

FIG. 5 is a partially cutaway side view of a recording sheet storage chamber, i.e., an enclosure portion, in an electrostatic recording apparatus according to an embodiment of the present invention. Referring to FIG. 5, reference numeral 11 denotes an electrostatic recording sheet, which is stored in airtight case 13 serving as an enclosure supported by disk-shaped holder 12. The lower outer periphery of holder 12 is placed on pin 15 rotatably held by L-shaped metal members **14*a* and 14*b* fixed to the bottom portion of case 13, and pin 15 rotatably supports the entire structure. Note that although two pins 15 are provided to each of holders 12 supporting recording sheet 11** at two sides thereof, FIG. 5 illustrates only one of them.

Electronic cooling device 16 is arranged in the opening of side plate **13*a* of case 13, so that its cooling surface faces the inside of the enclosure. Cooling device 16 is connected to a control circuit (not shown) including a power source, and cools the interior of case 13. Fan 17 is arranged to oppose the heating surface of device 16 facing outside case 13. Fan 17 need not always be provided. In this embodiment, however, fan 17 is arranged to exhaust heat from the heating surface of device 16. In addition, a fan can also be provided at the cooling surface side of case 13**.

As cooling device 16, "Thermocooler SL4F" available from Nippon Blower, Inc., can be used. This electronic cooling device consumes very little power (i.e., about 54 wattage) during operation, compared with a conventional device using a heater (which consumes about 200 wattage).

A means for guiding water droplets flowing from the cooling surface of device 16 is provided below device 16. More specifically, drain pipe 18 having, at its upper end, dew receiver **18*a* for receiving dew condensed from air at the cooling surface of device 16** is provided, and the lower end of drain pipe 18 extends outside case 13 to communicate with receiver 19 disposed outside case 13.

In the recording sheet storage chamber, when electronic cooling device 16 is energized, its cooling surface inside case 13 is cooled to condense aqueous components contained in the air inside case 13 into dew. As the amount of dew increase, it flows down the cooling surface, is received by receiver 18*a* of drain pipe 18, and is drained onto receiver 19.

With this arrangement, a 25° C., 75%RH atmosphere inside case 13 (volume: $0.044\ m^3=0.2\ m\times0.2\ m\times1.1\ m$) was decreased to 25° C. and 55%RH in about 15 minutes. In this test, the reason the temperature was not decreased is that the exterior of case 13 was exposed to ambient air and was heated thereby. When the humidity is decreased, it is preferable that the temperature is not decreased.

The dehumidifying method of forming dew on the cooling surface can advantageously prevent excessive dehumidification. When the air inside case 13 contains aqueous components exceeding a saturated water content, which is determined by the temperature of the cooling surface, the excess aqueous components are condensed into water droplets on the cooling surface and are removed, but the saturated water content remains. Therefore, with this method, the humidity inside the enclosure can be desirably set and maintained in accordance with the temperature of the cooling surface, unlike other dehumidifying methods. If the temperature of the cooling surface is not strictly controlled, as the humidity is decreased, the dehumidifying power is proportionally reduced to prevent excessive dehumidification.

In the first embodiment, when the exterior of case 13 is exposed to only a small amount of heat or when the cooling device has strong cooling power, the temperature inside case 13 may often be decreased.

Figure 6:
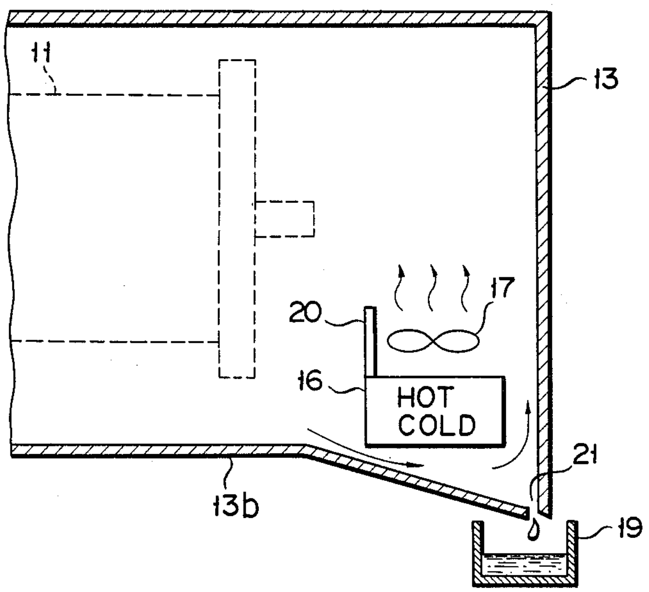
FIG. 6 is a partially cutaway side view of an arrangement according to a second embodiment of the present invention.

FIG. 6 shows a second embodiment of the present invention free from the above problem. With the second embodiment, the cooling and heating surfaces of electronic cooling device 16 are arranged inside airtight case 13 as an enclosure. Electronic cooling device 16 is arranged so that the cooling surface thereof opposes the bottom surface of case 13 to be separated therefrom by a given distance. Fan 17 is arranged to face the heating surface of device 16. Note that reference numeral 20 denotes a partition plate for improving airflow toward the cooling surface of device 16 at the lower side thereof. Partition plate 20 is mounted on device 16 so that one end thereof is in contact with the upper side portion of device 16. In addition, a blower means (not shown) for efficiently supplying air inside case 13 to the cooling surface is provided. Bottom plate portion 13*b* of case 13 opposing the cooling surface of device 16 is inclined downward toward a corner portion, in which drain port 21 is formed. Receiver 19 is arranged below drain port 21.

With the arrangement of the second embodiment, air near the cooling surface at the lower side of device 16 is cooled, and aqueous components contained therein are condensed into dew on the cooling surface. The dew drips onto bottom plate portion 13*b* to be drained into receiver 19. The cooled, dehumidified air is drawn upward upon operation of fan 17, and new air inside case 13 is introduced to the cooling surface of device 16 from below. The cooled air flowing above device 16 is heated by the heating surface of device 16, and is fed upward in case 13. This operation is repeatedly performed to dehumidify air inside case 13.

When single fan 17 is provided, since air heated by the heating surface is introduced to the cooling surface of device 16 from below, the cooling efficiency of device 16 can be improved. In addition, since the interior of case 13 is heated to correspond with power consumed by device 16, the relative humidity is further decreased. When an electronic cooling device is continuously energized, the cooling surface of the electronic cooling device is normally frozen, which degrades its cooling effect. However, with the second embodiment, since the cooling surface is heated by the heated air, it does not become frozen.

Figure 7:
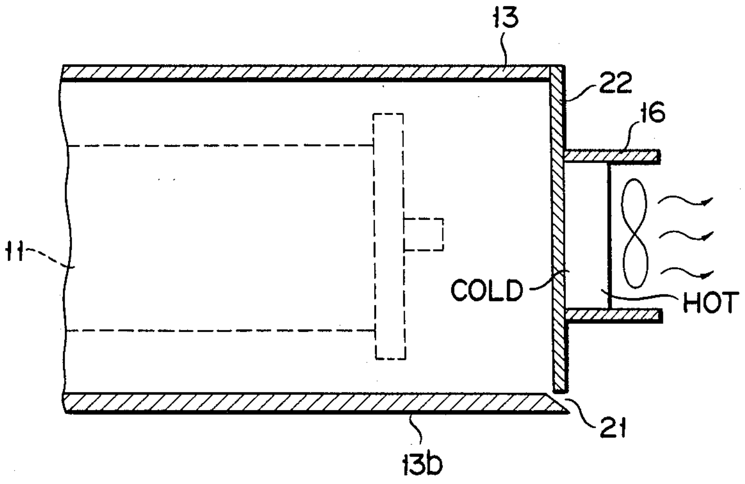
FIG. 7 is a partially cutaway side view of an arrangement according to a third embodiment of the present invention.

FIG. 7 is a partially cutaway side view of another mounting state of electronic cooling device 16 according to a third embodiment of the present invention. In the third embodiment, the side plate of airtight case 13 is formed of heat-transfer plate 22, and the cooling surface of electronic cooling device 16 is brought into direct contact with plate 22. In this case, when case 13 is formed of a heat-transfer member (e.g., metal), the side plate thereof need not be formed of a special heat-transfer plate. With this embodiment, a connecting portion between bottom plate 13*b* and plate 22 of case 13 is notched obliquely downward to form drain port 21.

Figure 8A:
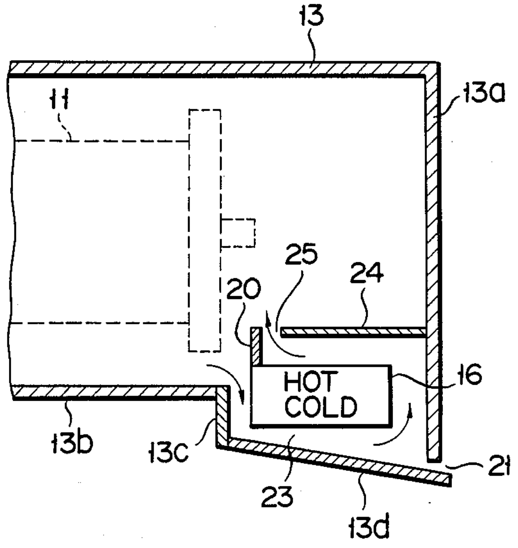
FIG. 8A is a partially cutaway side view of an arrangement according to a fourth embodiment of the present invention.

FIG. 8A shows a fourth embodiment of the present invention wherein when electronic cooling device 16 is arranged inside airtight case 13, as described in the second embodiment shown in FIG. 6, airflow inside case 13 is circulated without using fan 17. More specifically, bottom plate 13*b* of case 13 is partially notched, and electronic cooling device chamber 23 is defined by additional side plate 13*c*, additional bottom plate 13*d*, and the extending portion of side plate 13*a*. Electronic cooling device 16 is arranged in chamber 23 to be separated from plates 13*d*, 13*c*, and the extending portion of plate 13*a* by given distances, respectively, so that the cooling surface faces downward and the heating surface faces upward.

Note that airflow guide plate 24 is fixed to side plate 13*a* at one end thereof to face the heating surface of device 16 at a given distance. Vertical partition plate 20 is arranged at one end of the heating surface so as to form outlet port 25 for exhausting heated air between plate 20 and the other end of guide plate 24, and not to allow airflow inside case 13 toward the heating surface of device 16. Additional bottom plate 13*d* is inclined toward the lower end of side plate 13*a*, and forms drain port 21 therewith.

With the arrangement of the fourth embodiment, when electronic cooling device 16 is operated, air contacting the cooling surface thereof is cooled, and aqueous components contained therein are condensed into dew on the cooling surface. At the same time, air contacting the heating surface is heated to flow upward in case 13. Upon this upward airflow, the lower cooled air flows toward the heating surface from below, and the air inside case 13 then flows toward the cooling surface.

In this way, air inside case 13 is circulated to be dehumidified. During the dehumidifying operation, no operation noise is produced at all, and since there are no movable members, problems hardly ever occur.

Figure 8B:
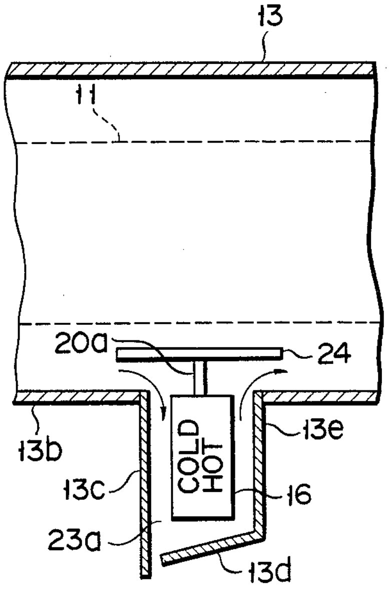
FIG. 8B is a partially cutaway side view of a modification of the fourth embodiment.

FIG. 8B shows a modification of the fourth embodiment shown in FIG. 8A. More specifically, in the embodiment shown in FIG. 8A, electronic cooling device 16 is arranged to be parallel to the end portion of airtight case 13. In this modification, however, electronic cooling device chamber 23*a* is formed in the lower central portion of case 13, and electronic cooling device 16 is vertically arranged in chamber 23*a* (that is, the cooling and heating surfaces face left and right, respectively). Reference numerals 13*c*, 13*e*, and 13*d* respectively denote additional side plates and an additional bottom plate constituting chamber 23*a*.

In this modification, partition plate 20*a* is arranged on the upper central portion of device 16, and the central portion of guide plate 24*a* is coupled to the upper end of plate 20*a*. With this arrangement, air inside case 13 circulates along the cooling and heating surfaces of device 16 to be dehumidified.

In the above embodiments, aqueous components contained in the air inside airtight case 13 are condensed into dew, and the dew is drained outside case 13, thereby decreasing the humidity. Alternatively, receiver 19 is arranged inside case 13 to be in contact with the cooling or heating surface of device 16, without having the dew drain outside case 13. In this case, the polarity of a voltage applied to device 16 can be inverted to convert the cooling surface into the heating surface, thus heating and evaporating the dew in receiver 19. In this way, the air inside case 13 can also be humidified. With this arrangement, when the polarity of the voltage applied to device 16 is controlled in accordance with variations in environmental humidity, the humidity inside case 13 can be maintained constant.

Note that when humidification must be performed over a long period of time, e.g., in the winter, water must be filled in receiver 19 from outside. This filling can be automatically performed. Alternatively, a lamp or the like can be used to notify an operator that a water refill is needed.

Figure 9:
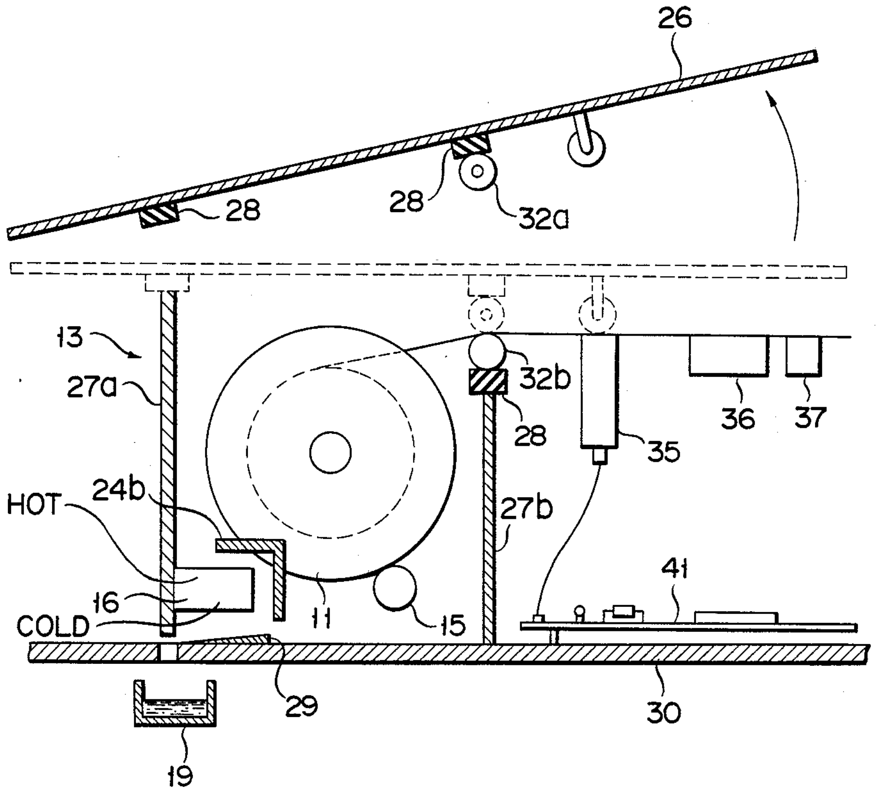
FIG. 9 is a partially cutaway side view of an arrangement according to a fifth embodiment of the present invention.

FIG. 9 is a sectional view showing a fifth embodiment of the present invention wherein a dehumidifying means of the present invention is arranged inside an electrostatic recording apparatus. Upper plate 26 of the recording apparatus is supported by a recording apparatus main body to be open and closable, and also serves as an upper plate of airtight case 13. In order to improve the airtight characteristics of case 13, sponges 28 are adhered to a contacting portion between upper plate 26 and the upper end of side plate 27*a* as a component of case 13, between lower feed roller 32*b* and the upper end of side plate 27*b* as a component of case 13, and between upper feed roller 32*a* and upper plate 26. Note that reference numeral 24*b* denotes a guide plate arranged adjacent to device 16; 29, an inclined plate, arranged on base 30 below the cooling surface of device 16, for allowing condensated water droplets to flow into receiver 19; and 41, a printed circuit board including a control circuit for producing a control voltage and the like to recording head 35 or the like.

With this apparatus, when upper plate 26 of the apparatus is closed, the upper end of one side plate 27*a* is brought into tight contact with plate 26 through sponge 28, and that of the other side plate 27*b* is also brought into tight contact with plate 26 through sponge 28 and rollers 32*a* and 32*b*. Thus, case 13 with good airtight characteristics can be formed. The operation of device 16 inside case 13 is the same as that described in the fourth embodiment shown in FIG. 8A.

The fifth embodiment has been described wherein a recording sheet is housed in an enclosure, and the air inside the enclosure is dehumidified upon operation of the cooling surface. When the recording sheet fed from the enclosure completes a recording process before being influenced by environmental humidity outside the enclosure, the fifth embodiment is effective. However, when a recording speed is low, the recording sheet may absorb moisture after it is fed from the enclosure and before it is subjected to re-recording. The other constituents of the recording apparatus (e.g., a recording head, a developing device, and the like) may also be adversely influenced by high humidity, resulting in unstable operation. In this case, a recording sheet feeding section and a recording sheet path are enclosed except for an opening for exhausting a recorded recording sheet, and cooling/dehumidifying means for dehumidifying the air inside the enclosure must be provided.

Figure 10:
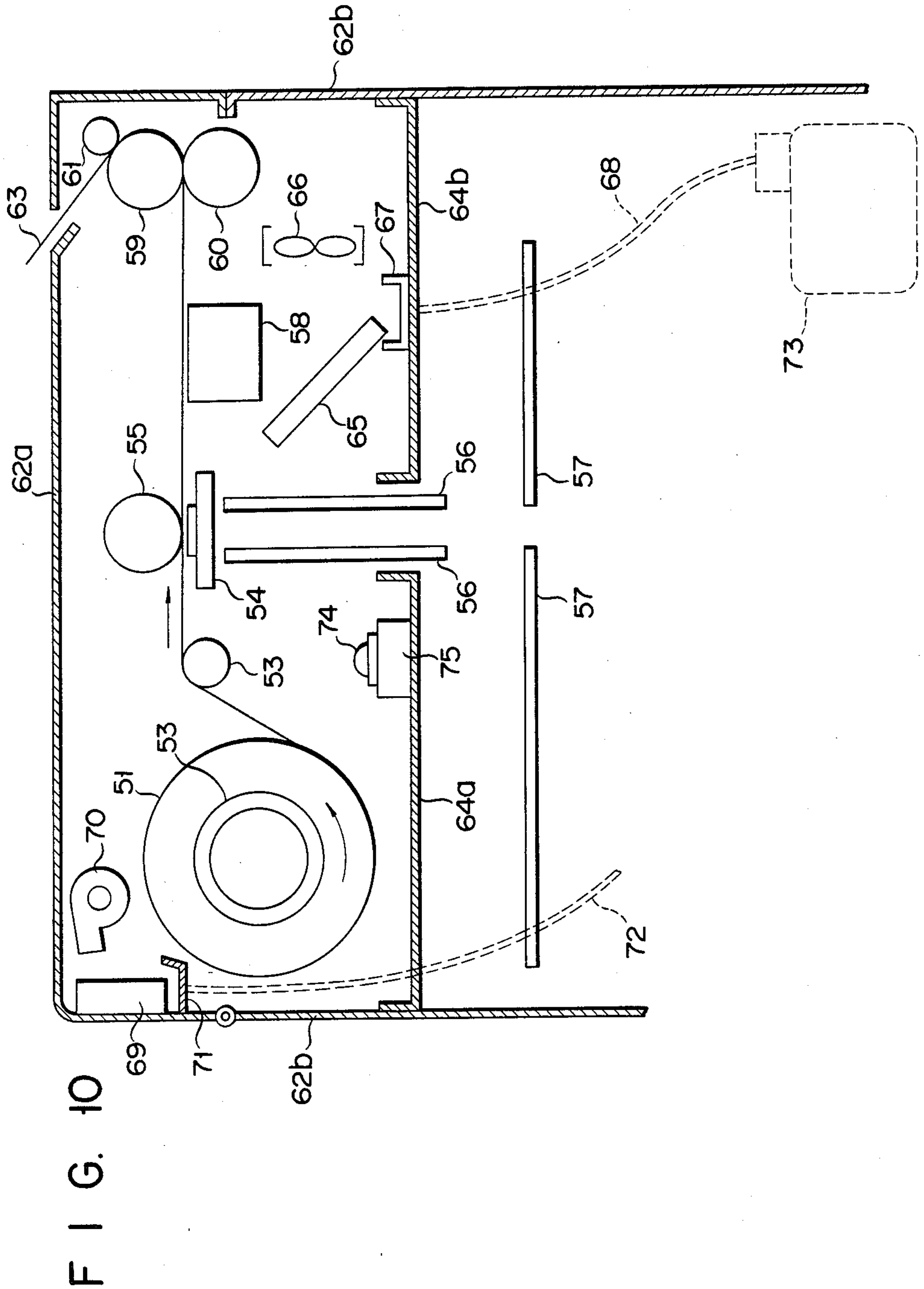
FIG. 10 is a partially cutaway side view of an arrangement according to a sixth embodiment of the present invention.

FIG. 10 shows a sixth embodiment of the present invention, wherein the present invention fulfilling the above requirement is applied to a monochrome printer using an electrostatic recording sheet. Referring to FIG. 10, reference numeral 51 denotes an electrostatic recording sheet roll arranged in a recording sheet stock section; 52, a sheet cylinder for roll 51; and 53, a recording sheet feed roller. Reference numeral 54 denotes an ion-flow recording head; 55, a back electrode roller; and 56 and 57, printed circuit boards on which a driver circuit and a signal processing circuit for head 54 are respectively formed. Reference numeral 58 denotes a liquid developer; 59, 60, and 61, exhaust rollers; 62*a*, a cover; 62*b*, a side cover; 63, a recording sheet feed opening; and 64*a* and 64*b*, partition plates. Reference numerals 65 and 69 denote electronic cooling devices using the Peltier effect; 66 and 70, fans arranged to oppose devices 65 and 69, respectively; 67 and 71, water trays for receiving dew from devices 65 and 69; 68 and 72, drain pipes; 73, a drain tank; 74, a humidity sensor; and 75, a control circuit for devices 65 and 69, fans 66 and 70, and the like.

Figure 1:
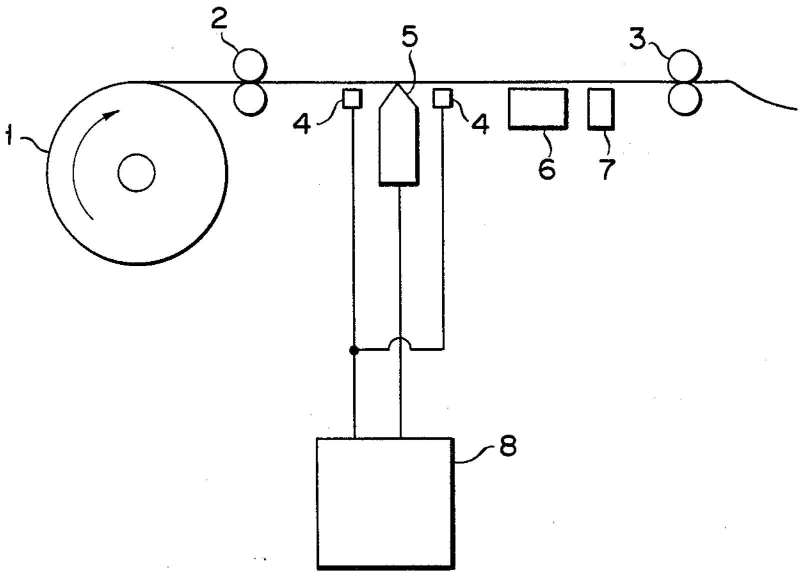
F I G. 1 (PRIOR ART)
FIG. 1 is a schematic diagram of a conventional arrangement.
Figure 2:
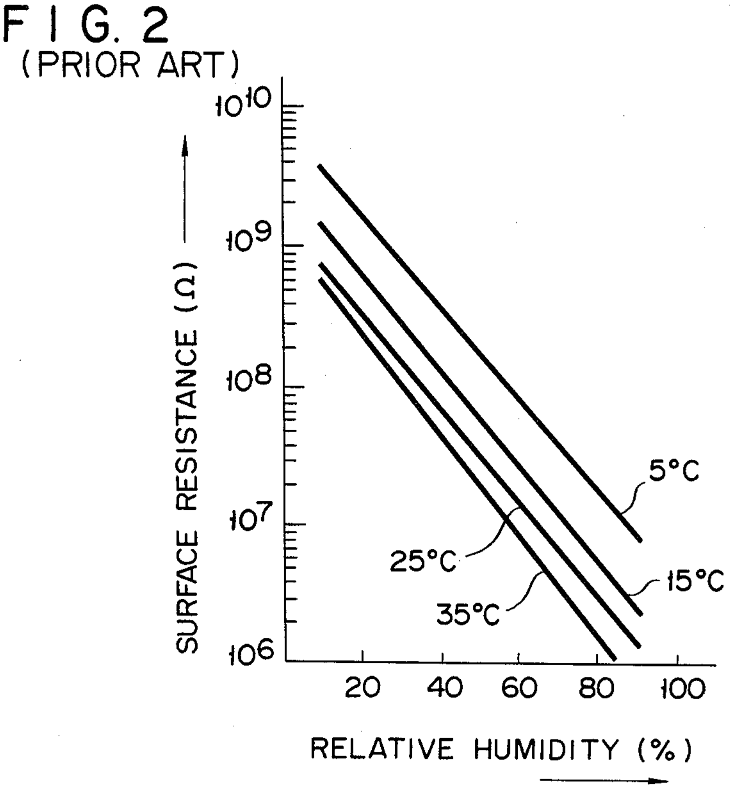
F I G. 2 (PRIOR ART)
FIG. 2 is a graph showing a change in surface resistance against a relative humidity.
Figure 3:
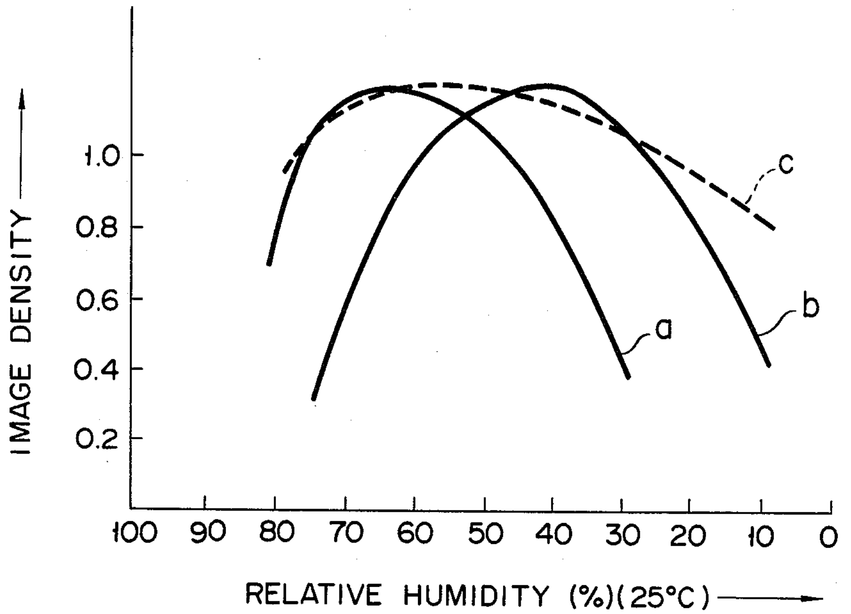
FIG. 3 (PRIOR ART)
FIG. 3 is a graph showing recording image density characteristics of various recording sheets.
Figure 4:
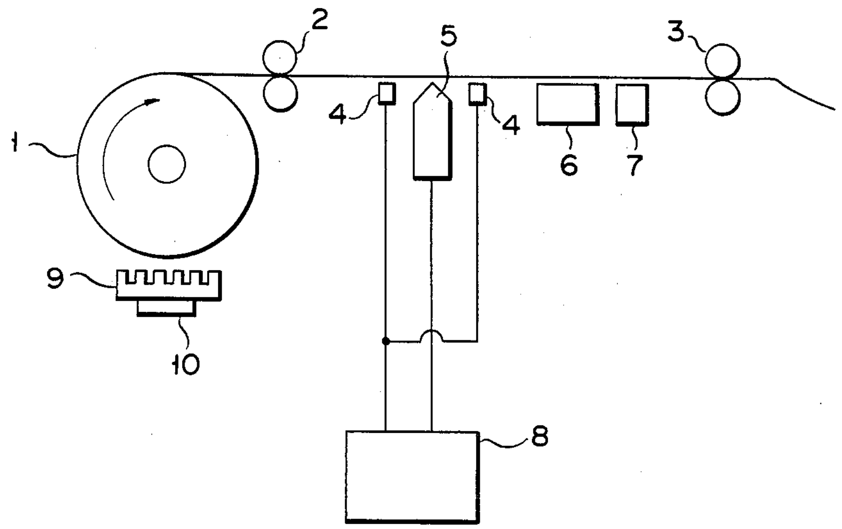
FIG. 4 (PRIOR ART)
FIG. 4 is a schematic diagram of another conventional arrangement.

There are various types of electrostatic recording sheets, as shown in FIG. 3. In this invention, a recording sheet of type b exhibiting good recording characteristics in the low-humidity state is preferably used, and a recording sheet of type a is undesirable since it cannot cope with the low-humidity state. Although a recording sheet of type c is undesirable because of its high cost, it can be applied to the present invention.

An electrostatic recording sheet is fed from roll 51 in the direction indicated by arrows in FIG. 10, and an electrostatic latent image is formed thereon by head 54. Although a contact type multistylus head can be adopted as head 54, a non-contact type ion-flow head is used in this embodiment. Ion-flow recording heads disclosed in U.S. Pat. Nos. 3,689,935, 4,160,257, 4,365,549, and the like, or that disclosed in Japanese Patent Disclosure No. 60-219071 can be adopted.

The recording sheet travels by means of roller 55 while maintaining a gap between itself and head 54, and the latent image formed thereon is developed by developer 58 to form a toner image. Thereafter, the recording sheet is exhausted outside the apparatus through opening 63 upon operation of rollers 59, 60, and 61.

The above-mentioned arrangement of the recording apparatus belongs to the prior art. However, when the dehumidifying means of the present invention is not used, in a high-humidity atmosphere, roll 51 absorbs moisture, and characteristics thereof are gradually degraded from the outer portion of the roll. This degradation also progresses while the recording apparatus is disabled. During the recording operation, while the recording sheet is unrolled from roll 51 and moves toward developer 58, it absorbs moisture from its front and back surfaces and its recording characteristics are degraded. Although moisture absorption progresses after developer 58, since a toner image is already formed on the sheet, its effect is negligible.

According to the present invention, in order to prevent degradation of the recording sheet caused by moisture absorption and leading to poor image quality, i.e., by moisture absorption in a sheet stock section and that in a sheet convey path extending from the stock section to developer 58, an enclosing chamber for integrally enclosing the above-mentioned arrangement is formed, and a dehumidifying means for decreasing the humidity therein is provided.

In this embodiment, a chamber defined by covers *62a* and *62b* and partition plates *64a* and *64b* encloses the sheet stock section and the sheet convey path extending from the stock section to developer 58.

A drying agent utilizing the deliquescence properties of calcium chloride and the like, or a moisture-absorption drying agent can be used. However, these provide only an insufficient dehumidifying effect, and require frequent maintenance. For this reason, in this embodiment, a cooling, dew condensation type dehumidifying device using electronic cooling devices 65 and 69 is adopted to achieve effective dehumidification with lower energy. In addition, the air inside the enclosure is blown toward the cooling surfaces of devices 65 and 69 using fans 66 and 70. Although fans 66 and 70 are not indispensable, they help to uniformly dehumidify the air inside the enclosure and circulate air near the cooling surfaces to improve the dehumidifying effect. Water droplets condensed on the cooling surfaces of devices 65 and 69 are collected by trays 67 and 71, and are then stored in tank 73 through pipes 68 and 72. Although a power source and a controller for devices 65 and 69 are not shown in detail, they are arranged so that the temperature of the cooling surfaces of devices 65 and 69 are not decreased below a freezing point, which leads to frost formation and prevents the cooling effect. More specifically, devices 65 and 69 are energized to maintain the temperature of the cooling surfaces at 0° C. or higher, or the current direction is periodically reversed for defrosting the cooling surfaces.

The heating surface of device 65, arranged at the central portion of the enclosure, is exposed inside the enclosure to increase the temperature and to decrease the relative humidity. However, in view of the efficiency of the electronic cooling device, it is preferable that air is blown toward the heating surface by means of a fan to enhance the cooling effect. The heating surface of the other device 69 is arranged to be substantially in contact with cover *62a*. In this case, since cover *62a* serves as a heat radiation plate, the heating surface of device 69 need not have air blown to it to be cooled, and a good dehumidifying effect can be obtained.

The dew condensation type dehumidifying means is not limited to that using a Peltier effect element. A dehumidifying device using a cooling device which adiabatically expands a gas compressed by a compressor can be provided inside the enclosure. Alternatively, air dehumidified by a separate cooling device can be supplied and circulated inside the enclosure through a duct. These methods are very desirable since they will not adversely influence the arrangement inside the apparatus with heat.

The dehumidifying operation by the dehumidifying means is preferably performed while the recording apparatus is disabled. However, as can be seen from the graph shown in FIG. 3, it is undesirable to excessively dry the enclosure. As the inside of the enclosure is being dried, the dehumidifying effect of the dehumidifying means is reduced, and external air enters the enclosure through a gap therein. Therefore, the humidity is balanced at a certain level, and the air is no longer excessively dried. In order to more positively maintain the humidity inside the enclosure at the optimal value, control circuit 75 is operated based on the detection output from humidity sensor 74 arranged in the enclosure, thereby controlling the cooling/dehumidifying means (e.g., devices 65 and 69, and fans 66 and 70). In the sixth embodiment, the resultant water droplets are stored in tank 73. If tank 73 should overflow, the floor under the apparatus may be flooded. Thus, a liquid-level sensor can be provided to notify an operator that the tank will overflow, or to stop the operation of the dehumidifying means. An evaporation pan can be provided in place of tank 73 to disperse the drained water into the ambient air. Alternatively, a nonwoven fabric is dipped in tank 73 and is extended along a cover portion corresponding to the heating surface of device 69, which is in contact with the cover, so that drained water is drawn up from tank 73 to be evaporated outside the enclosure.

According to the present invention, the sheet stock section and the sheet convey path extending from the stock section to the developer are enclosed by the covers and partition plates. As a result, the recording head portion is also enclosed in the enclosure, and can be protected from the adverse influences of high humidity. In this embodiment, the ion-flow head is adopted as the recording head, as described previously. In the ion-flow head, a problem caused by moisture absorption, such that dust becomes attached inside or around an opening for forming an ion-flow to induce malfunction, can be eliminated. When the recording head is a multistylus head, a trouble, such that a stylus electrode is rusted by moisture to degrade recording quality can be eliminated with the above arrangement. In addition, damage to electrodes caused by current leakage between stylus wirings can also be prevented. Moreover, with this embodiment, the recording sheet will not absorb moisture to noticeably change its mechanical properties. Therefore, the recording sheet can be protected from being wrinkled, thus preventing poor development when a suction type developer is used.

In this embodiment, a recording sheet roll is used. However, the present invention can be applied and the same effect as described above can be obtained when cut sheets are used. As for the developing method, a liquid developer is used in this embodiment. However, the present invention can provide the same effect when a dry developer is used.

In an apparatus having a color image forming section in which images of different colors are formed on a single sheet at different timings to form a multicolor image, a time interval between image formation for a first color and that for a last color is relatively long. During this interval, a change in the water content of a recording sheet changes its size, thus causing shifting of the colors. According to the present invention, in order to prevent this, an enclosure for enclosing a recording sheet supply section and a recording sheet path of a color image forming section is formed, and a cooling-/dehumidifying means is provided to condense aqueous components in the air inside the enclosure into dew, thereby dehumidifying the air inside the enclosure.

Figure 11:
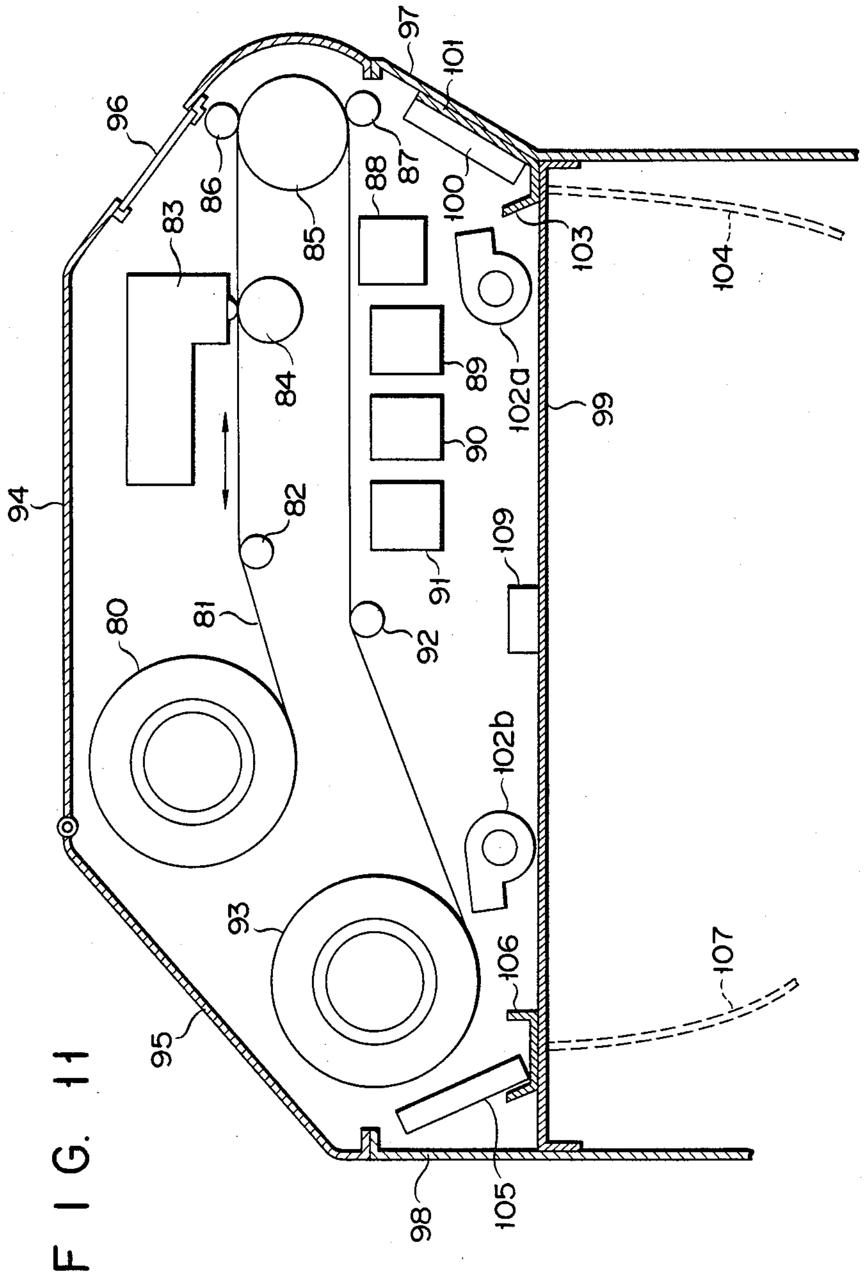
FIG. 11 is a partially cutaway side view of an arrangement according to a seventh embodiment of the present invention.

FIG. 11 shows a seventh embodiment of the present invention. A color image recording apparatus has a recording sheet supply roll, a recording sheet takeup roll, and a color image forming section arranged therebetween, and also has a mechanism for reciprocating the recording sheet between the supply and takeup rolls for each color image formation. In this apparatus, an enclosure for enclosing a recording sheet convey path extending between the supply and takeup rolls through the color image forming section is formed, and a cooling/dehumidifying means is provided to condense aqueous components in the air inside the enclosure into dew, thereby dehumidifying the air inside the enclosure. Referring to FIG. 11, reference numeral 80 denotes an electrostatic recording sheet roll at the supply side; 81, an electrostatic recording sheet traveling along a convey path; 82, a recording sheet supply roller; 83, a multistylus electrostatic recording head; 84, a conductive roller having an elasticity and arranged to be urged against recording head 83; 85, a capstan roller; 86 and 87, compression rollers arranged to oppose capstan roller 85; 88, 89, 90, and 91, developers storing different colors of liquid developing agents; 92, a guide roller at the takeup side 93; a takeup roll for the electrostatic recording sheet; 94 and 95, covers; 96, an observation window; 97 and 98, side covers; 99, a partition plate; 100 and 105, electronic cooling devices; 101, a heat transfer plate; **102*a* and 102*b*, fans; 103 and 106, water trays; 104 and 107, drain pipes; and 109**, a control circuit.

In the electrostatic image recording apparatus for color image formation, the recording sheet is reciprocated several times to form a multicolor image. This mechanism is well known to those skilled in the art, e.g., in U.S. Pat. No. 4,485,982, and is omitted from the drawings. Developers 88 to 91 can be moved vertically. For example, during image formation for a first color, one of developers 88 to 91 is moved upward to face the convey path, thus performing development. FIG. 11 illustrates that developer 88 is at its operating position. Recording sheet 81 is fed from roll 80 to the right in FIG. 11, and is urged against head 83 by roller 84. Thus, an electrostatic latent image is formed on sheet 81 by head 83 to which a recording signal is applied. Sheet 81 is rotated through 180° so that the latent image surface faces downward while being urged against roller 85, and the passes through the developing section. Sheet 81 on which a toner image is formed by developer 88 is temporarily wound around roll 93 through guide roller 92. After image formation for the first color, sheet 81 is conveyed in the reverse direction, and is wound around roll 80.

Image formation for the second color is performed while again conveying sheet 81 to the right in FIG. 11. During this operation, sheet 81 is subjected to environmental influences. Since sheet 81 is reciprocated three to five times in color image formation, this time interval cannot be ignored.

In this embodiment, in order to prevent moisture absorption of sheet 81 during the recording operation and moisture absorption of roll 80 and sheet 81 while it is fed along the convey path in the standby state, an enclosure for enclosing rolls 80 and 93 and the convey path extending therebetween is formed and is dehumidified to maintain a good image quality.

In this embodiment, the enclosure is defined by upper cover 94, side covers 97 and 98, and partition plate 99. A dehumidifying means comprising electronic cooling devices 100 and 105, and fans **102*a* and 102*b* is arranged inside the enclosure, in the same manner as in the sixth embodiment shown in FIG. 10, and control circuit 109** is also arranged therein. The operation of these components is the same as the sixth embodiment, and a detailed description thereof will be omitted.

In this embodiment, since the convey path extending between rolls 80 and 93 is kept dried, sheet 81 will not absorb moisture and good recording characteristics thereof can be maintained. In addition, since sheet 81 can be prevented from being wrinkled, erroneous development will not occur. Since the mechanical properties of sheet 81 are not degraded by moisture absorption, shifting of the resultant color images caused by a change in the size of sheet 81 can be avoided.

FIG. 11 exemplifies the embodiment wherein the present invention is applied to the color image forming apparatus using electrostatic recording sheet 81. The present invention can be applied to a color image forming apparatus using an electrophotographic sheet or to heat-sublimation transfer and heat-melting transfer type color image forming apparatuses, and the same effect as above can be obtained in this case.

The color image forming apparatus shown in FIG. 11 takes up recorded sheet 81. Therefore, when recorded sheets are frequently taken outside the apparatus in units of a small number of images, this is a very cumbersome operation. In this case, an arrangement which feeds the recorded sheet outside the apparatus is used. With this arrangement, however, since a recording sheet must reciprocate inside and outside the apparatus several times, it is inevitably exposed to outside air during this operation. Therefore, a dehumidifying effect is degraded compared with the embodiment shown in FIG. 11, in which a recording sheet is not exposed to air until final development is completed. However, since this apparatus also adopts the arrangement in which a supply roll and a sheet convey path extending between the supply roll and an exhaust roller are enclosed in an enclosure, and the inside of the enclosure is dehumidified, it is far superior to a conventional apparatus.

According to the present invention, in the color image forming apparatus having a recording sheet supply section, a color image forming section, and a mechanism for reciprocating an identical portion of a recording sheet with respect to the color image forming section, a recording sheet convey path between the recording sheet supply section and the color image forming section is enclosed by an enclosure except for a sheet exhaust opening, and a cooling/dehumidifying means is provided to condense aqueous components of the air inside the enclosure, thus dehumidifying the air therein.

Figure 12:
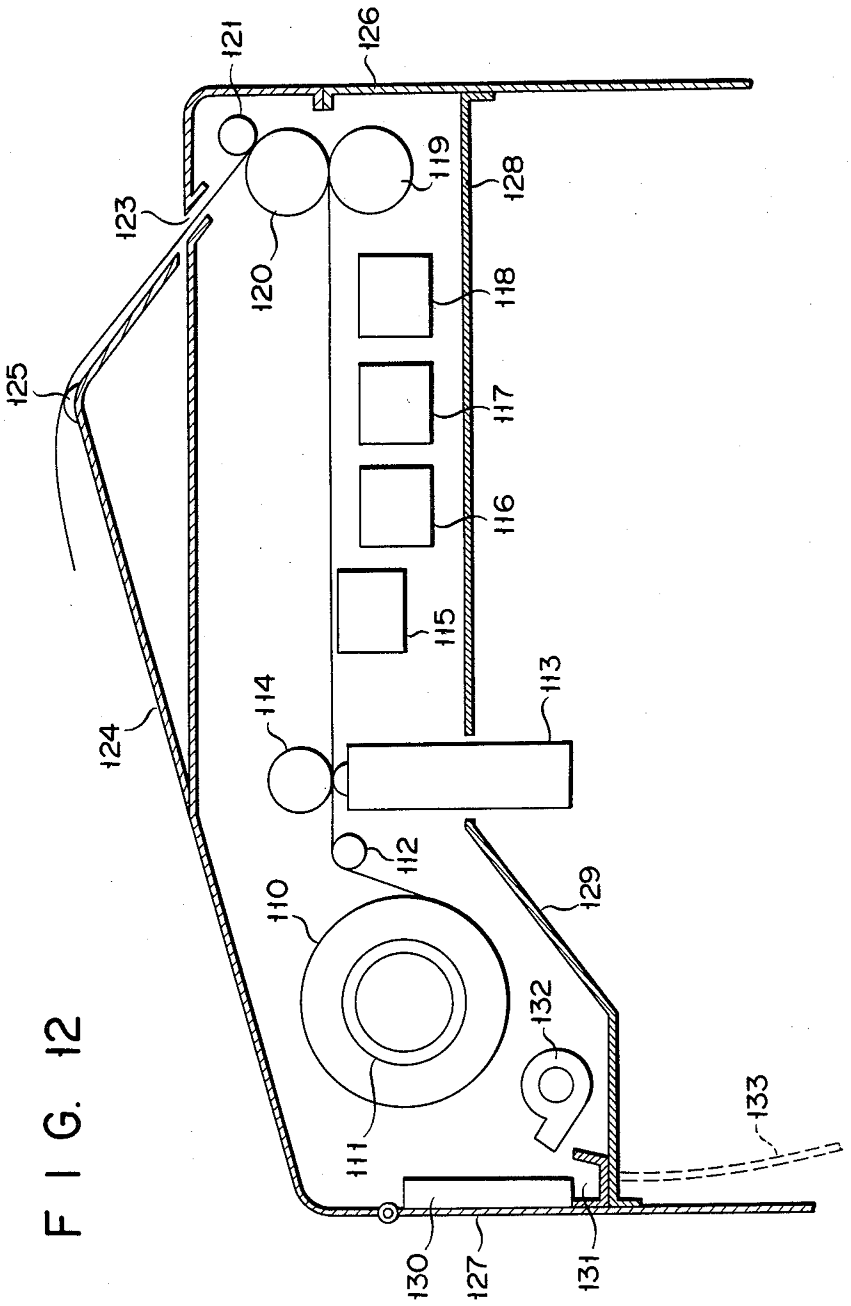
FIG. 12 is a partially cutaway side view of an arrangement according to an eighth embodiment of the present invention.

FIG. 12 is a schematic sectional view showing an eighth embodiment of the present invention. Referring to FIG. 12, reference numeral 110 denotes a recording sheet roll wound around sheet cylinder 111 and arranged in a stock section. Reference numeral 112 denotes a sheet supply roller; 113, a multistylus recording head; 114, a back electrode roller; 115, 116, 117, and 118, developers storing toners of different colors; 119, 120, and 121, exhaust rollers; 122, a cover; 123, slit-like opening formed in cover 122; 124, a guide plate; 125, a guide roller; 126 and 127, side covers; 128 and 129, partition plates; 130, a Peltier effect element; 131, a water tray; 132, a fan; and 133, a drain pipe.

The color image forming procedure of this embodiment is substantially the same as that in the seventh embodiment shown in FIG. 11. In the embodiment shown in FIG. 11, the takeup roll takes up the recording sheet portions both during and after image formation. In contrast to this, in this embodiment, the recording sheet during image formation is temporarily fed outside the apparatus, and is then returned inside the apparatus.

Slit-like opening 123 allows reciprocal movement of recording sheet 110*a* during image formation. In this case, sheet 110*a* can be smoothly reciprocated by means of guide plate 124 and guide roller 125. The recording sheet convey path extending from roll 110 to opening 123 is arranged inside an enclosure defined by covers 122, 126, and 127, and partition plates 128 and 129. The inside of the enclosure can be dehumidified by a dehumidifying means comprising electronic cooling device 130 and fan 132.

Even if the environmental state outside the apparatus is in the high-humidity state, the inside of the enclosure can be maintained in the low-humidity state. The recording sheet stored in the enclosure is also dehumidified, and recording head 113 opposing the convey path is also arranged in the dehumidified atmosphere, thus preventing adverse influence of high humidity thereto.

However, during color image formation, recording sheet 110*a* is temporarily fed outside the apparatus, and is again wound inside the apparatus. While sheet 110*a* is outside the apparatus, it comes under the influence of the environmetal state. This leads to a reduction in the dehumidifying effect of the present invention with respect to sheet 110*a*. However, the dehumidifying effect inside the enclosure is effective enough to compensate for this disadvantage.

In the embodiment shown in FIG. 12, when only slight moisture absorption by sheet 110*a* is to be eliminated, the path of sheet 110*a* exhausted by rollers 119, 120, and 121 is preferably formed inside the enclosure as long as possible, so that sheet 110*a* is keep inside the enclosure within the structural limits.

In the embodiment shown in FIG. 12, although the apparatus is slightly influenced by enviromental humidity, a sheet on which color image formation is completed is exhausted outside the apparatus through opening 123. If an auto cutter is arranged on this portion, the sheet can be cut into a desired size, resulting in convenient handling.

In addition, according to the present invention, a new and improved apparatus which removes the influence of environmental humidity to obtain a sufficient antimoisture/dehumidifying effect, and which allows mounting of, e.g., an auto cutter with high operability, can be provided. For this purpose, the apparatus of the present invention comprises a recording sheet storage section for storing a recording sheet supply roll and a recording sheet during image formation, a color image forming section, a means for reciprocating a recording sheet between the recording sheet-supply roll and the storage section through the color image forming section, and an exhaust opening for exhausting the recording sheet after image formation. In addition, an enclosure for enclosing the recording supply roll, the recording sheet convey path of the color image forming section, and the recording sheet storage section, except for the exhaust opening, is formed, and a cooling-/dehumidifying means is provided to condense aqueous components in the air inside the enclosure, thereby dehumidifying the air therein.

Figure 13:
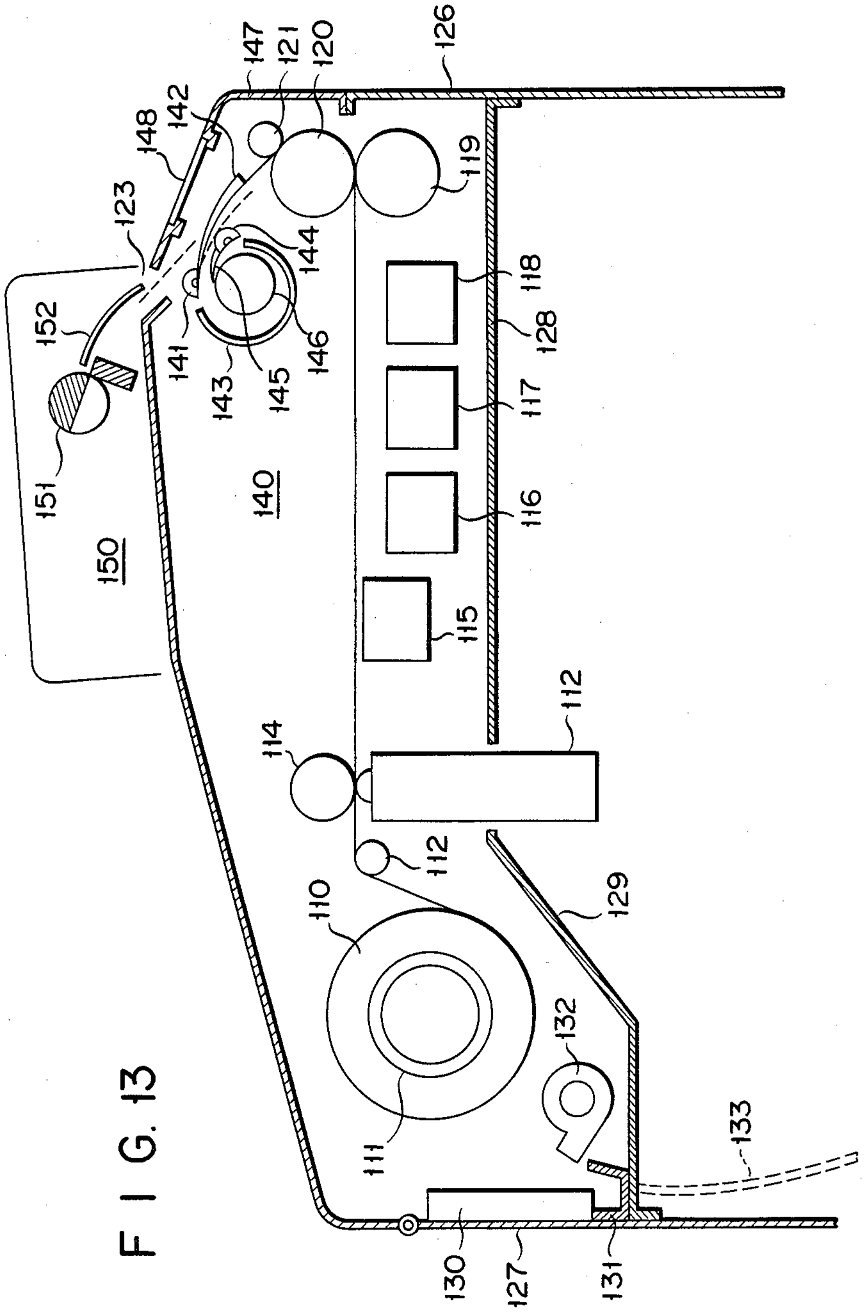
FIG. 13 is a partially cutaway side view of an arrangement according to a ninth embodiment of the present invention.

FIG. 13 shows a ninth embodiment of the present invention. In FIG. 13, reference numeral 140 denotes a recording sheet storage mechanism; and 150, an auto cutter. Storage mechanism 140 comprises guide plate 142, which is pivotal about shaft 141, roll-like guide plate 143, takeup guide plate 145 which is pivotal about shaft 144, takeup roller 146, and the like. When guide plate 142 is at the position shown in FIG. 13, the recording sheet is wound and stored in mechansim 140 upon operation of guide plates 142, 143, and 145, and roller 146. The recording sheet fed during each color image formation is temporarily stored in mechansim 140, and is then fed for the next color image formation. After the image formation for the last color, guide plate 142 is positioned as indicated by the dotted line in FIG. 13, thus exhausting the recording sheet outside the apparatus through exhaust opening 123 formed in the enclosure. Reference numeral 147 denotes a front cover; and 148, an observation window provided to cover 147, which allows observation of images during formation through a transparent plate. Auto cutter 150 is arranged to face exhaust opening 123, and cuts the recorded sheet in a desired length and width.

Reference numeral 151 denotes a rotary cutter for cutting the recording sheet along its longitudinal direction. Reference numeral 152 denotes a guide plate. FIG. 13 does not illustrate a cutter for the widthwise direction, and other recording sheet conveying means. Although not shown, drive means (e.g., motors) are arranged on the shafts of sheet cylinder 111, rollers 120 and 146, and the like, thereby controlling their rotating directions and performing sheet conveyance necessary for forming a multicolor image.

First, the recording sheet is fed to the right in FIG. 13, and an image of a first color or a mark for control is formed thereon. Guide plate 142 is positioned as indicated by the solid line in FIG. 13, and guides the distal end of the recording sheet toward roller 146. Guide plate 143 is fixed, and the distal end of guide plate 145 is biased about shaft 144 toward roller 146, thus urging the recording sheet against roller 146 to wind it therearound. After image formation for the first color, the recording sheet is wound around roll 110, and is then fed for the next color image formation. Window 148 for observing a formed image during this operation is formed by sealing, with a transparent plate, an opening facing the image surface of the sheet convey path extending from the color image forming section to the storage section. In this case, since guide plate 142 is notched or has a wire-frame structure, an image formed on the recording sheet can be observed.

After a series of image forming operations (i.e., a multicolor image of one page is formed), guide plate 142 is shifted to the position indicated by the dotted line in FIG. 13 in the final paper feed step. The recorded sheet is then exhausted outside the enclosure through exhaust opening 123. In this embodiment, since auto cutter 150 is provided, the recorded sheet is fed to cutter 150.

The present invention is not limited to the above embodiment, and various changes and modifications may be made within the spirit and scope of the invention.

According to the present invention, an image forming apparatus can be provided wherein moisture absorption by a recording sheet under high-humidity conditions can be effectively prevented, various problems associated therewith (e.g., a decrease in recording density, poor development caused by paper wrinkles, shifting of the color images, and the like) can be prevented, and degradation in constitutents (e.g., a recording head) of the apparatus or malfunction thereof can be prevented.

What is claimed is:

1. An image forming apparatus comprising:

an image forming paper supply section for supplying image forming paper having a paper base;

an image forming section for forming a given image on said image forming paper supplied from said image forming paper supply section;

an enclosure fully enclosing at least said image forming paper supply section except for a paper exhaust opening of the image forming section to keep air from entering said enclosure; and cooling/dehumidifying means for cooling the inside of said enclosure and condensing aqueous components contained in the air inside said enclosure, to thereby dehumidify the inside of said enclosure.

2. An apparatus according to claim 1, wherein said cooling/dehumidifying means comprises an electronic cooling device having cooling and heating surfaces.

3. An apparatus according to claim 2, wherein said electronic cooling device is arranged to expose the cooling surface to the inside of said enclosure, and means for exhausting the condensed aqueous components outside said enclosure is arranged below the cooling surface.

4. An apparatus according to claim 2, wherein said electronic cooling device is arranged inside said enclosure so that the air in said enclosure is circulated from the cooling surface via the heating surface, and a drain opening for draining the condensed aqueous components is formed in a bottom portion of said enclosure.

5. An apparatus according to claim 2, wherein said enclosure is partially constituted by a heat conductive member, said electronic cooling device is arranged such that the cooling surface thereof is brought into tight contact with the outer surface of said heat conductive member, and a drain opening for draining the condensed aqueous components is formed in a bottom portion of said enclosure.

6. An apparatus according to claim 1, wherein said enclosure integrally encloses said image forming paper supply section and said image forming section.

7. In a image forming apparatus having a recording paper roll, a recording head, a developer, and an exhaust roller for forming, on an electrostatic recording sheet, an electrostatic latent image by said recording head and for forming a toner image by said developer, and for exhausting the recording sheet with a toner image formed thereon by said exhaust roller, the improvement comprising:

an enclosing chamber substantially fully enclosing a recording paper roll, a recording head, a developer, an exhaust roller, and a sheet convey path extending between the recording paper roll and the exhaust roller to keep air from entering said enclosing chamber, and a cooling, dew condensation type dehumidifying device provided in the enclosing chamber.

8. An apparatus according to claim 6, wherein said enclosure encloses an image forming paper takeup section.

9. An apparatus according to claim 8, wherein said enclosure has an observation window.

10. In an image forming apparatus having a recording sheet supply roll, a recording sheet takeup roll, and a color image forming section arranged therebetween, and also having a mechanism for reciprocating the recording sheet between the supply and takeup rolls for each color image formation, the improvement comprising:

an enclosure for enclosing a recording sheet convey path extending between the supply and takeup rolls through the color image forming section, and a cooling/dehumidifying means provided to condense aqueous components in the air inside the enclosure into due, thereby dehumidifying the air inside the enclosure.

* * * * *